United States Patent
Rosenthal et al.

(10) Patent No.: US 11,432,479 B2
(45) Date of Patent: Sep. 6, 2022

(54) STRING TRIMMER WITH BLOWER

(71) Applicant: Black & Decker, Inc., New Britain, CT (US)

(72) Inventors: Matthew Rosenthal, Baltimore, MD (US); Justin Cooper, Shrewsbury, PA (US)

(73) Assignee: Black & Decker, Inc., New Britain, CT (US)

( * ) Notice: Subject to any disclaimer, the term of this patent is extended or adjusted under 35 U.S.C. 154(b) by 385 days.

(21) Appl. No.: 16/528,729

(22) Filed: Aug. 1, 2019

(65) Prior Publication Data

US 2021/0029898 A1    Feb. 4, 2021

(51) Int. Cl.
| | |
|---|---|
| *A01G 20/47* | (2018.01) |
| *A01D 34/416* | (2006.01) |
| *A01D 69/06* | (2006.01) |
| *F04D 17/08* | (2006.01) |
| *F16H 1/06* | (2006.01) |
| *F16H 57/00* | (2012.01) |

(52) U.S. Cl.
CPC ........... *A01G 20/47* (2018.02); *A01D 34/416* (2013.01); *A01D 69/06* (2013.01); *F04D 17/08* (2013.01); *F16H 1/06* (2013.01); *F16H 57/0031* (2013.01)

(58) Field of Classification Search
CPC ...... A01G 20/47; A01D 34/416; A01D 69/06; F04D 17/08; F16H 1/06; F16H 57/0031
USPC .......................................................... 30/276
See application file for complete search history.

(56) References Cited

U.S. PATENT DOCUMENTS

| | | |
|---|---|---|
| 6,349,475 B1 | 2/2002 | Buck |
| 6,442,845 B2 | 9/2002 | Wheeler et al. |
| 7,047,592 B2 | 5/2006 | Sing et al. |
| 7,100,287 B2 | 9/2006 | McCoid |
| 8,256,120 B2 | 9/2012 | Million et al. |
| 8,914,981 B1 | 12/2014 | Paez |
| 9,472,992 B2 | 10/2016 | Shaffer |
| 9,750,180 B2 * | 9/2017 | Pearson ................. A01G 20/47 |
| 9,918,428 B2 | 3/2018 | Yamaoka et al. |
| 2006/0123635 A1 | 6/2006 | Hurley et al. |
| 2007/0209346 A1 | 9/2007 | Bovo et al. |
| 2008/0092398 A1 | 4/2008 | Hurley et al. |

(Continued)

FOREIGN PATENT DOCUMENTS

| | | |
|---|---|---|
| DE | 20201600600 U1 | 11/2016 |
| JP | H04121107 A | 4/1992 |

OTHER PUBLICATIONS

Extended European Search Report, dated Jan. 15, 2021, for corresponding application No. 20188109.1-1004.

*Primary Examiner* — Omar Flores Sanchez
(74) *Attorney, Agent, or Firm* — John Yun; Adan Ayala (57) ABSTRACT

The present invention is directed to a string trimmer having a blower feature incorporated therein. The string trimmer has a cutting head for holding a spool with cutting line. The cutting line is rotated at high speed to cut grass and other vegetation. The cutting head also includes a fan for generating an airflow to act as a blower. The string trimmer can be operated in two modes. In a first mode, both the fan and the spool housing are engaged with the motor so that the rotation of the spool housing performs a cutting operation. In a second mode, the motor engages only the fan to blow air, and the spool housing is disengaged so no cutting operation is performed.

16 Claims, 14 Drawing Sheets

(56) References Cited

U.S. PATENT DOCUMENTS

| | | |
|---|---|---|
| 2009/0038283 A1 | 2/2009 | Hurley |
| 2009/0090094 A1* | 4/2009 | Million ................ A01D 34/90 56/13.4 |
| 2010/0088902 A1 | 4/2010 | Hurley |
| 2011/0131815 A1 | 6/2011 | Hurley |
| 2018/0271012 A1 | 9/2018 | Guo et al. |
| 2021/0170565 A1* | 6/2021 | Lauciello ................ B25F 5/008 |

* cited by examiner

STRING TRIMMER WITH BLOWER

FIELD OF THE INVENTION

The present invention is a string trimmer in combination with a blower.

BACKGROUND OF THE INVENTION

String trimmers with filament cutting lines are well known in the art. These string trimmers have a cutting head that is rotated at a high speed, with the filament line extending out from the cutting head to cut through grass and other light vegetation. This offers users a portable and easy to use cutting tool, but the cut grass often leave a messy appearance.

Users who wish to maintain a clean yard must then use a broom or a blower to move the debris off sidewalks and other areas. Needing a second tool requires an additional expense and the hassle of having to retrieve the tool when needed. Therefore, it would be desirable to have a string trimmer with a blower feature incorporated into the tool.

BRIEF SUMMARY OF THE INVENTION

Accordingly, the present invention is directed to a string trimmer for cutting grass that includes a blower for blowing the cut debris. The string trimmer has a cutting head with a spool housing for holding a spool with cutting line. A motor is connected to the spool housing to rotate the cutting line at high speed. The cutting head also includes a fan for generating an airflow for the blowing function.

A transmission is provided in the cutting head for selectively engaging the spool housing. In a first mode of operation where the cutting feature is desired, the motor rotates in a first direction, and through the use of a one-way pinion gear, the spool housing is operatively driven and rotated to cut grass. In a second mode of operation, where only the blowing feature is desired, the motor is rotated in a second direction, opposite to the first. The fan, which is directly connected to the motor, rotates to generate the airflow. However, the one-way pinion gear does not transfer the rotation of the motor to the spool housing and so no cutting function is actuated.

In an embodiment of the invention, the one-way gear has an inner ring with a series of ramps around is perimeter and an outer ring surrounding the inner ring. A series of rollers are located in between the inner ring and outer ring, and in the first mode of operation the rollers move up the ramps to lock the inner ring and outer ring together for joint rotation, and in the second mode of operation, the rollers move down the ramp to allow the inner ring to rotate freely with respect to the outer ring.

In another embodiment of the invention, the one-way gear comprises a ring with a series of rollers partially exposed around its inner perimeter. The rollers sit in a cavity and depending on the rotation of the motor, either freely rotate or engage an edge of the cavity to lock the rollers with the ring.

In a further embodiment, the cutting head includes a fan housing having a volute that extends around the fan housing to direct air out of the fan housing.

In another embodiment of the invention, a locking lever is provided that engages with the teeth of the drive gear. Since the drive gear is connected to the spool housing, the lever prevents the spool housing from rotating when the tool is in the blower mode. In yet another embodiment of the invention, the lever is replaced with a second one-way gear to prevent the spool housing from rotating.

In yet a further embodiment, the fan is a radial fan having a top plate, a bottom plate and a series of blades between the top plate and the bottom plate.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
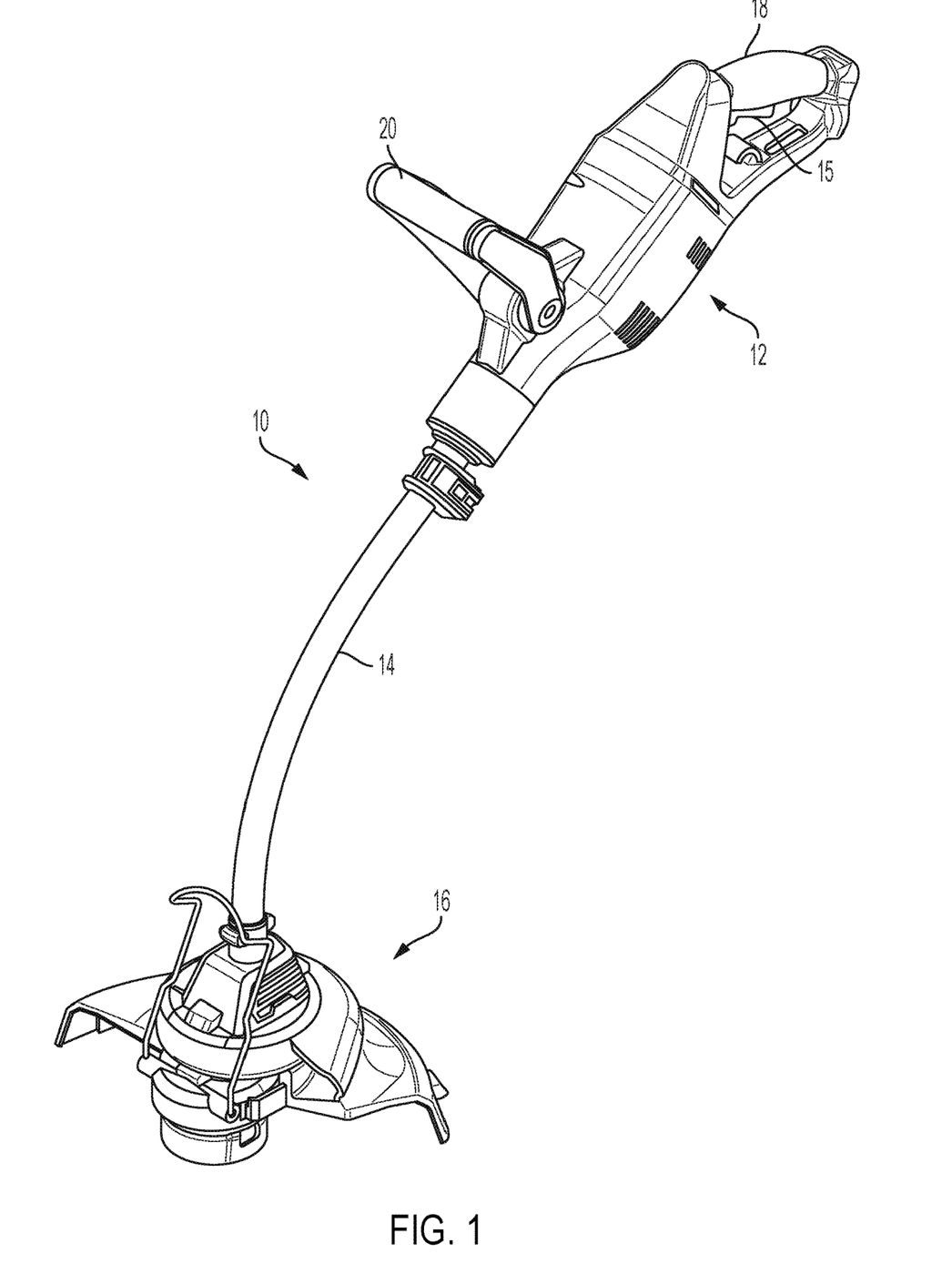
FIG. 1 is a perspective view of a string trimmer according to an embodiment of the invention.
Figure 1A:
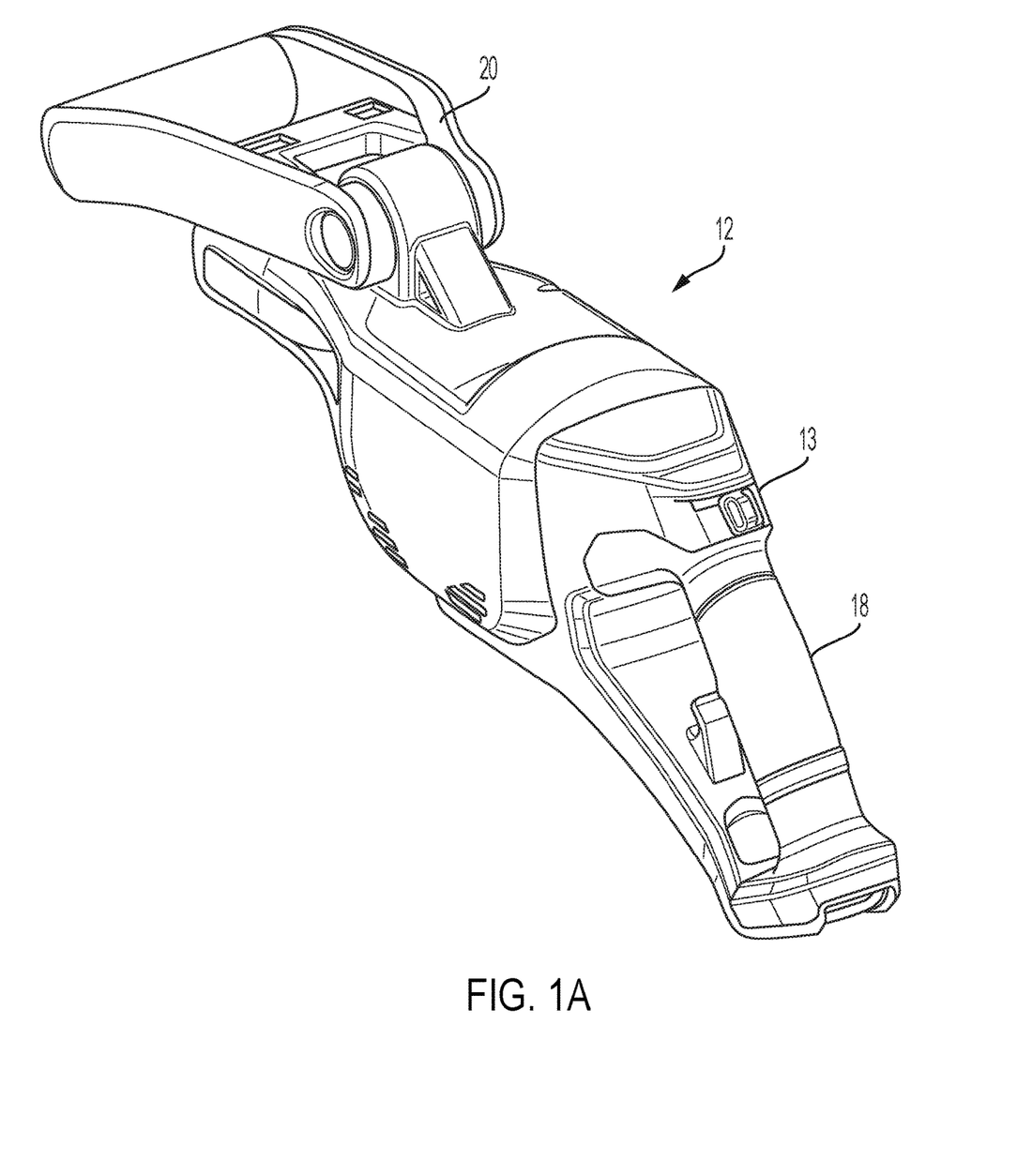
FIG. 1A is a view of the main housing of the string trimmer.

FIG. 1 shows a string trimmer 10 according to an embodiment of the present invention. The string trimmer 10 includes a main housing 12 on a first end of a support member 14 and a cutting head 16 on an opposing end of the support member 14. The main housing 12 encloses a motor (not shown) and includes a primary handle 18 with a trigger 15 for providing power to the motor and a secondary support handle 20. FIG. 1A shows a slide switch 13 on the main housing 12 for reversing the direction of the motor. The motor can be powered by a rechargeable battery or by an AC power cord.

Figure 2:
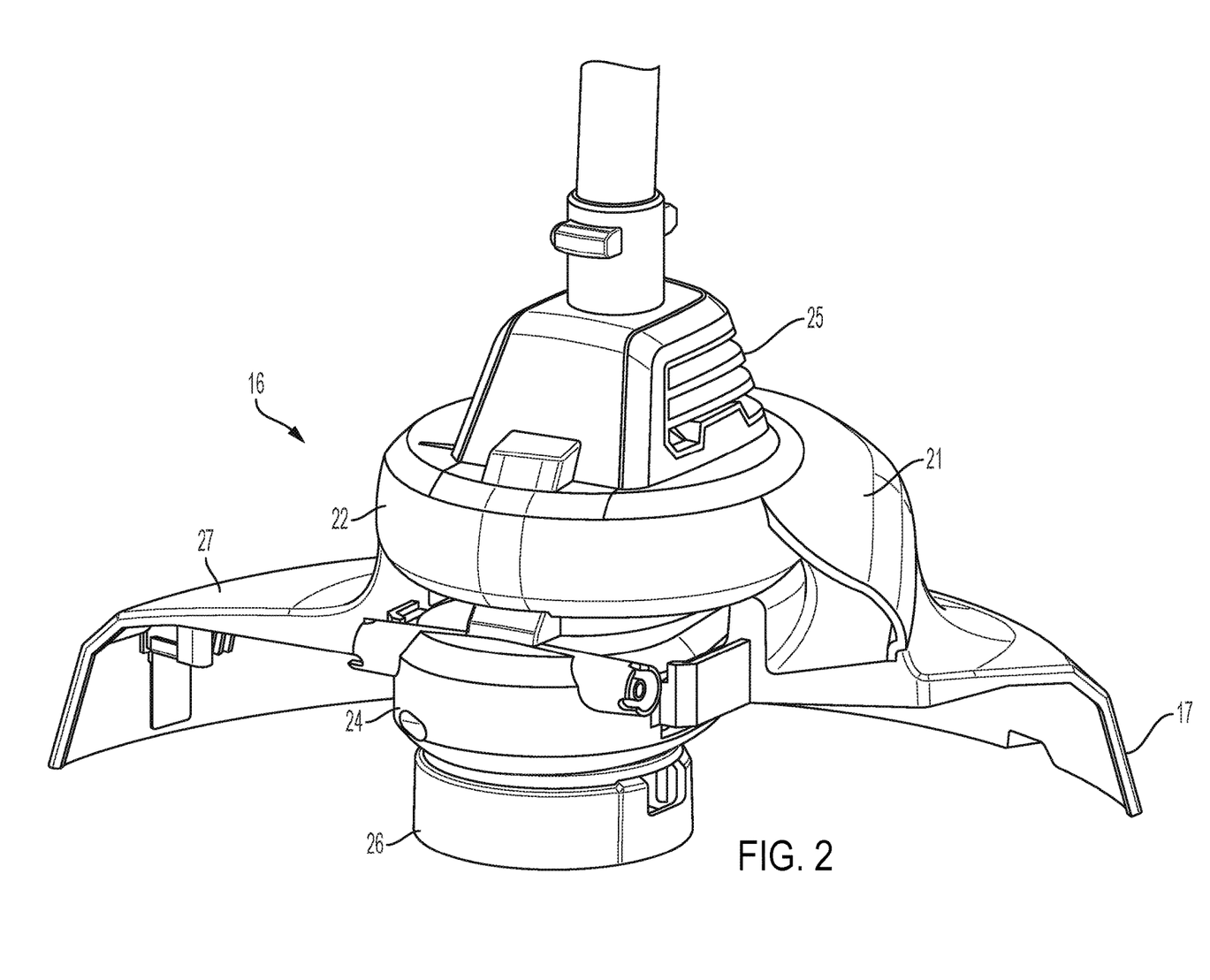
FIG. 2 is view of the cutting head of the string trimmer.

Referring now to FIG. 2, the cutting head 16 has an upper portion defined by a fan housing 22 and a lower portion made up of a transmission housing 24. Below the transmission housing 24 is a spool housing 26 for holding a spool (not shown) with filament line. A volute or outlet nozzle 21 partially encircles the fan housing 22, and a guard 17 lies below the volute.

Figure 3:
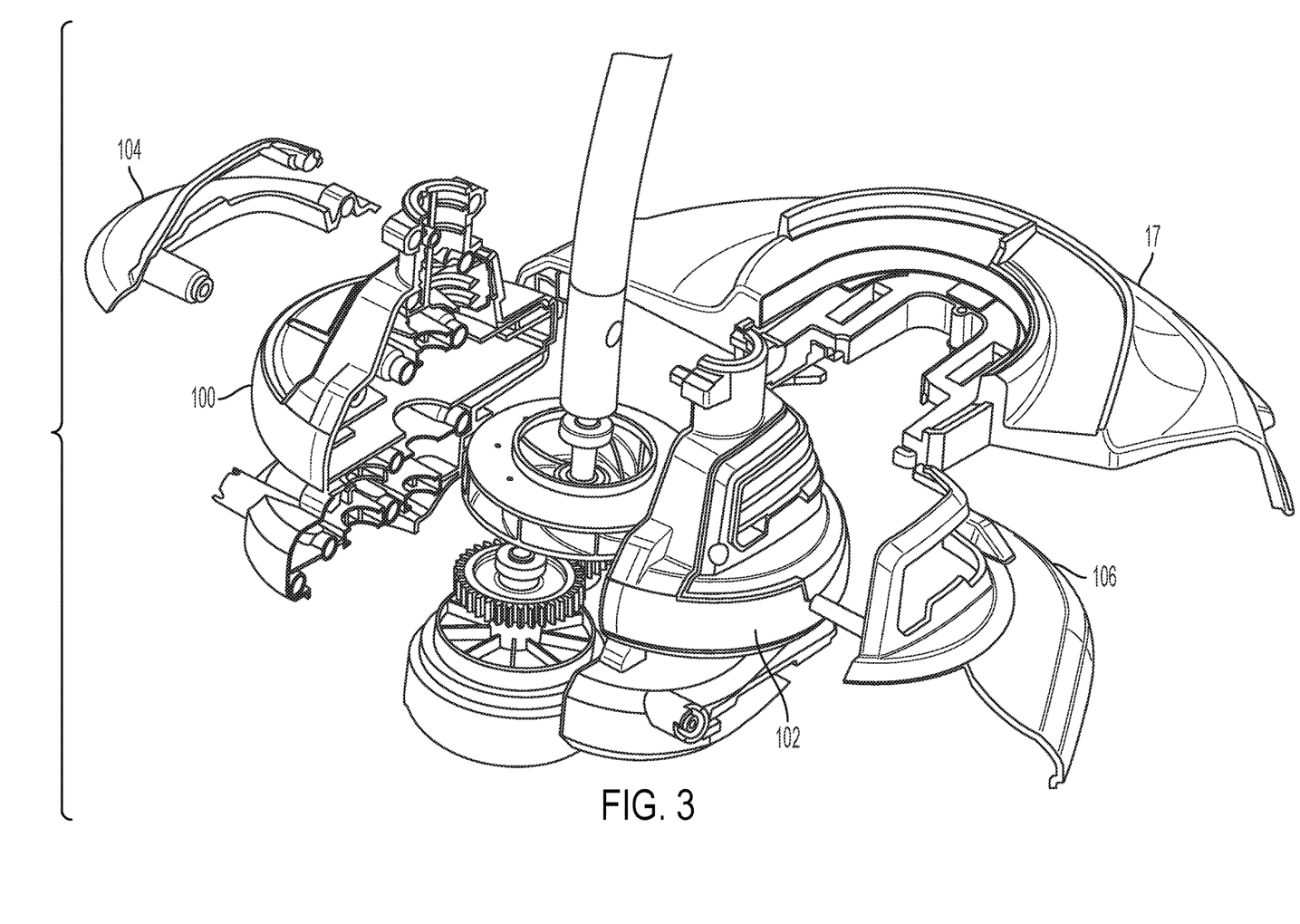
FIG. 3 is an exploded view of the cutting head of FIG. 2.
Figure 3A:
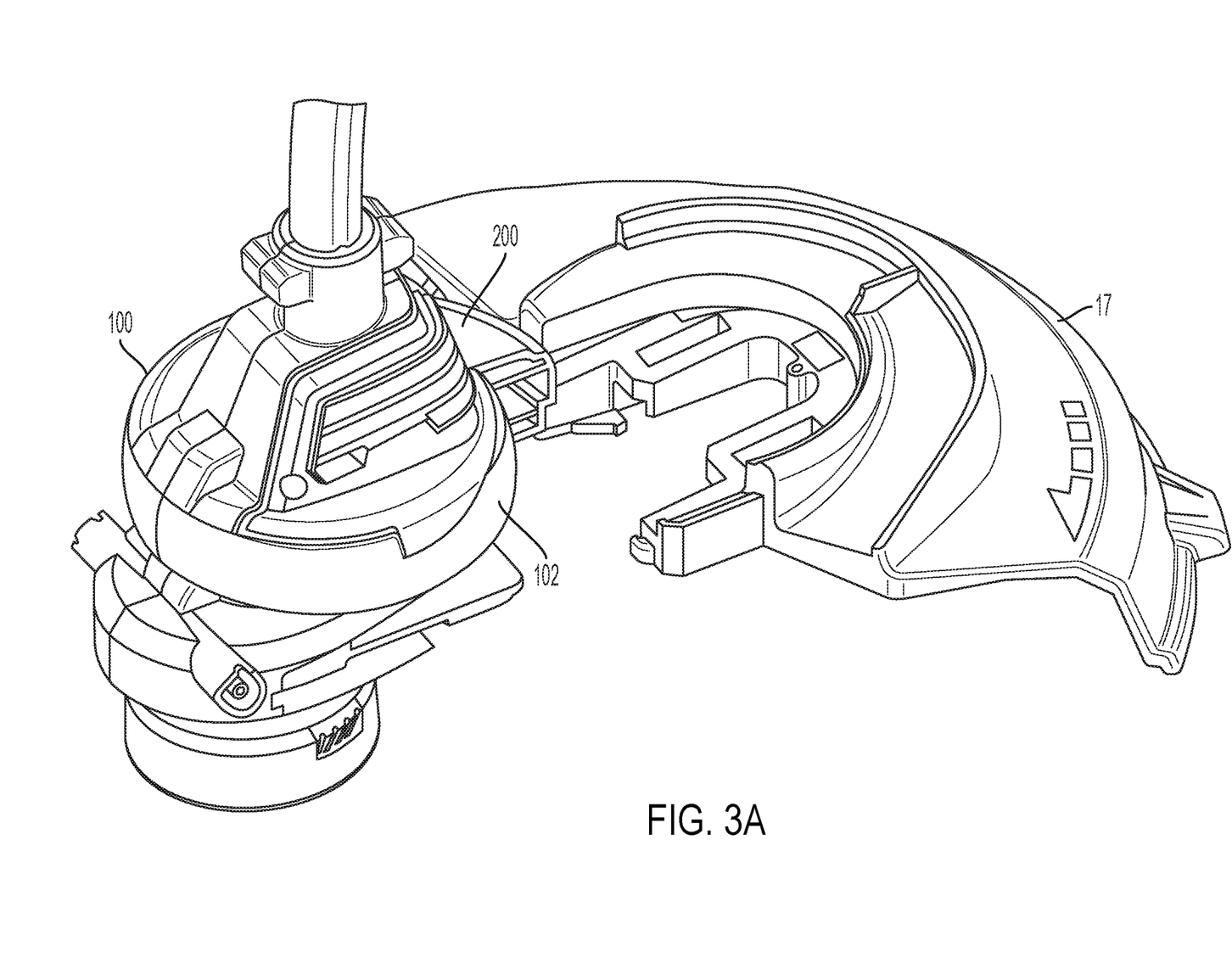
FIG. 3A is a partially assembled view of the cutting head.

The cutting head 16 is formed from multiple pieces, as shown in the exploded view of FIG. 3, with two clamshell portions 100, 102 forming the main part of the cutting head. Two cover portions 104 and 106 are secured to each other around the clamshell portions 100 and 102. The volute 21 is formed by the clamshell portions 100 and 102 and by cover portions 104 and 106. As best shown in FIG. 3A, the clamshells 100 and 102 are not identical, with clamshell 100 being larger than clamshell 102, thus forming an airtube 200 that leads directly into an air pathway formed by cover portion 106. These together form the volute 21.

Figure 4:
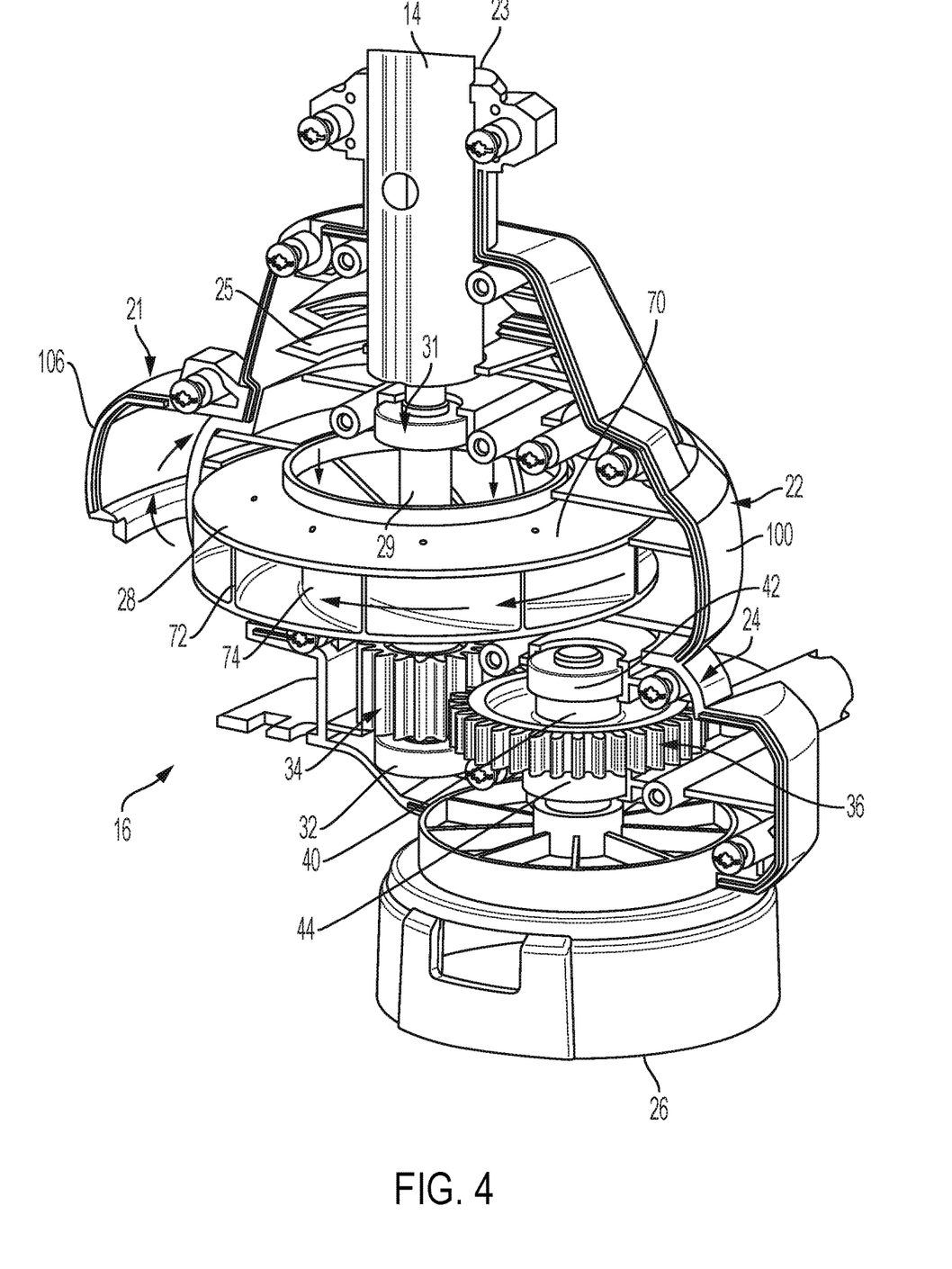
FIG. 4 is a sectional view of the cutting head.
Figure 4A:
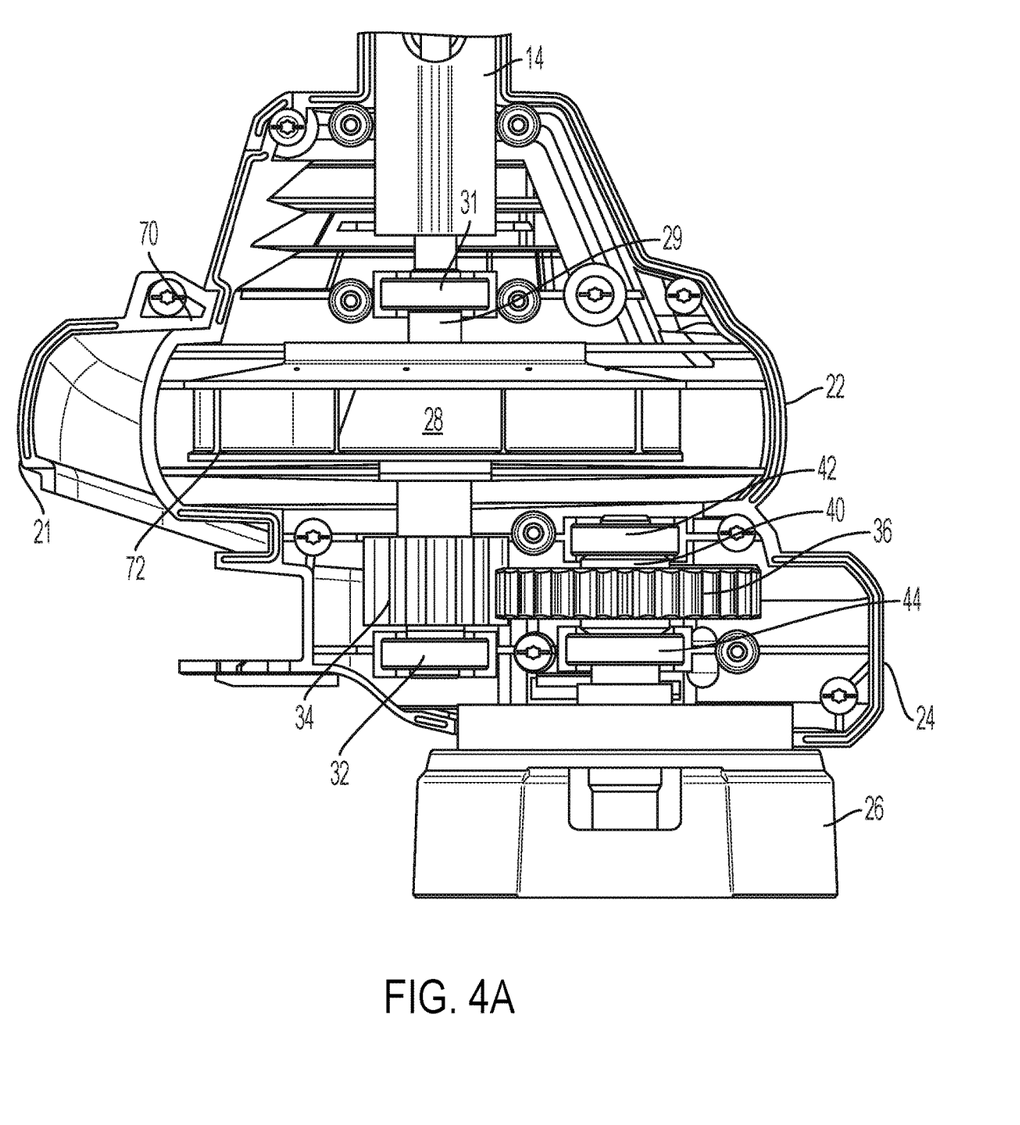
FIG. 4A is a side view of FIG. 4.
Figure 5:
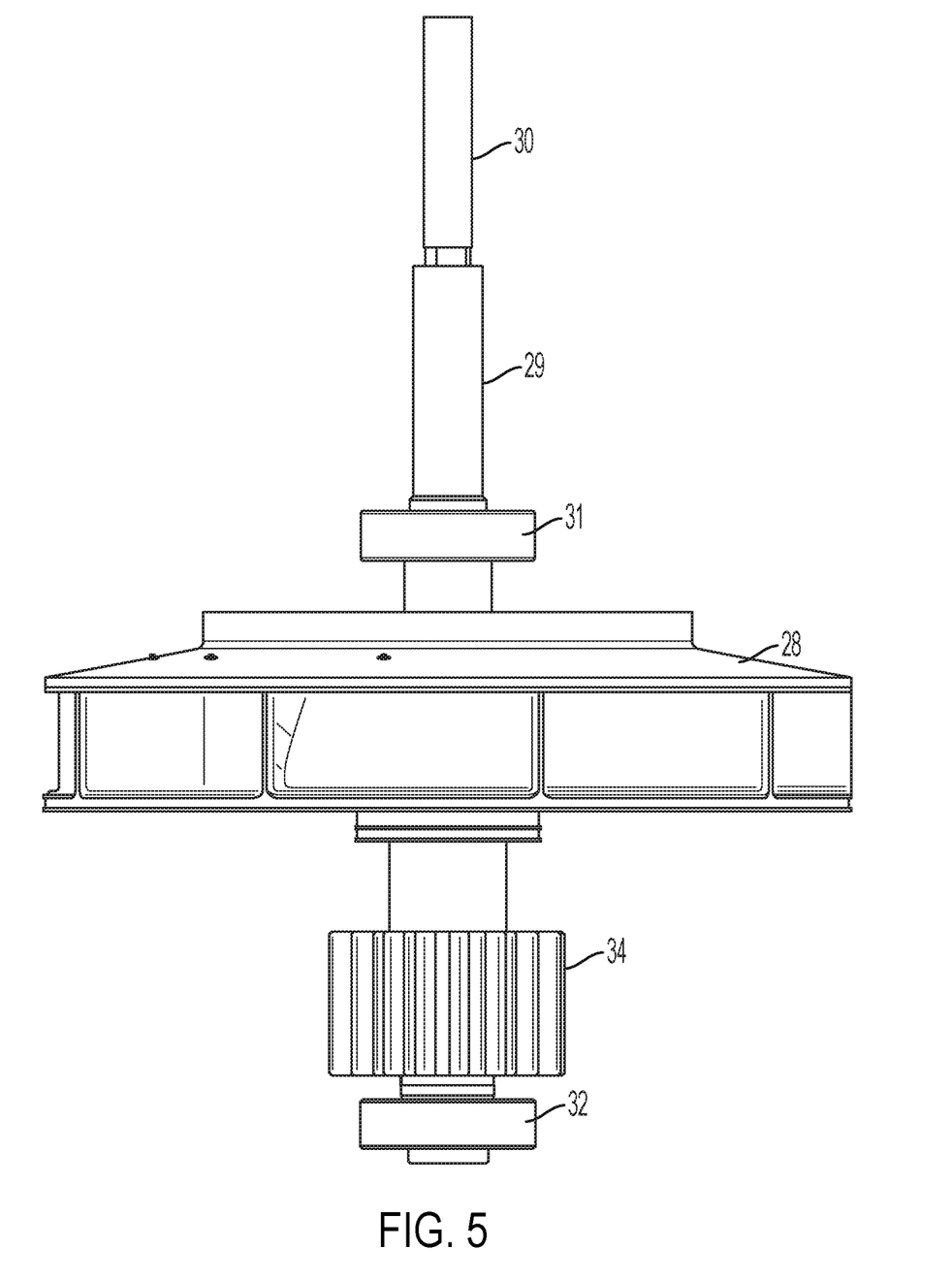
FIG. 5 is a side view of the fan and fan coupling member.

Referring to FIGS. 4 and 4A, the fan housing 22 is shown enclosing a fan 28. A top portion of the fan housing 22 has an opening 23 that allows the support member 14 to pass through. The support member 14 is a hollow tube and holds a flexible drive shaft 30 that extends from the motor to the fan 28. FIG. 5 shows the drive shaft 30 secured to a fan coupling member 29. The fan coupling member 29 is fixedly connected to the fan 28 and includes bearings 31 and 32 above and below the fan, respectively. A locking one-way pinion gear 34 is secured to the fan coupling member 29 below the fan 28.

Referring back to FIG. 4, the fan housing 22 includes vents 25 (also seen in FIG. 2) that allow outside air to enter the fan housing 22. The air then pass through a center opening in the fan 28 and is expelled out laterally through the side of the fan. The airpath is shown by arrows in FIG. 4. The air then passes into the volute 21 and expelled out of the cutting head.

Referring again to FIGS. 4 and 4A, the pinion gear 34, which is fixedly secured to the fan coupling member 29, engages a drive gear 36. The drive gear 36 is fixed to the spool housing 26 via shaft 40. The shaft 40 is held in place by bearings 42 and 44. The pinion gear 34 and drive gear 36 are positioned inside the transmission housing 24.

Figure 6:
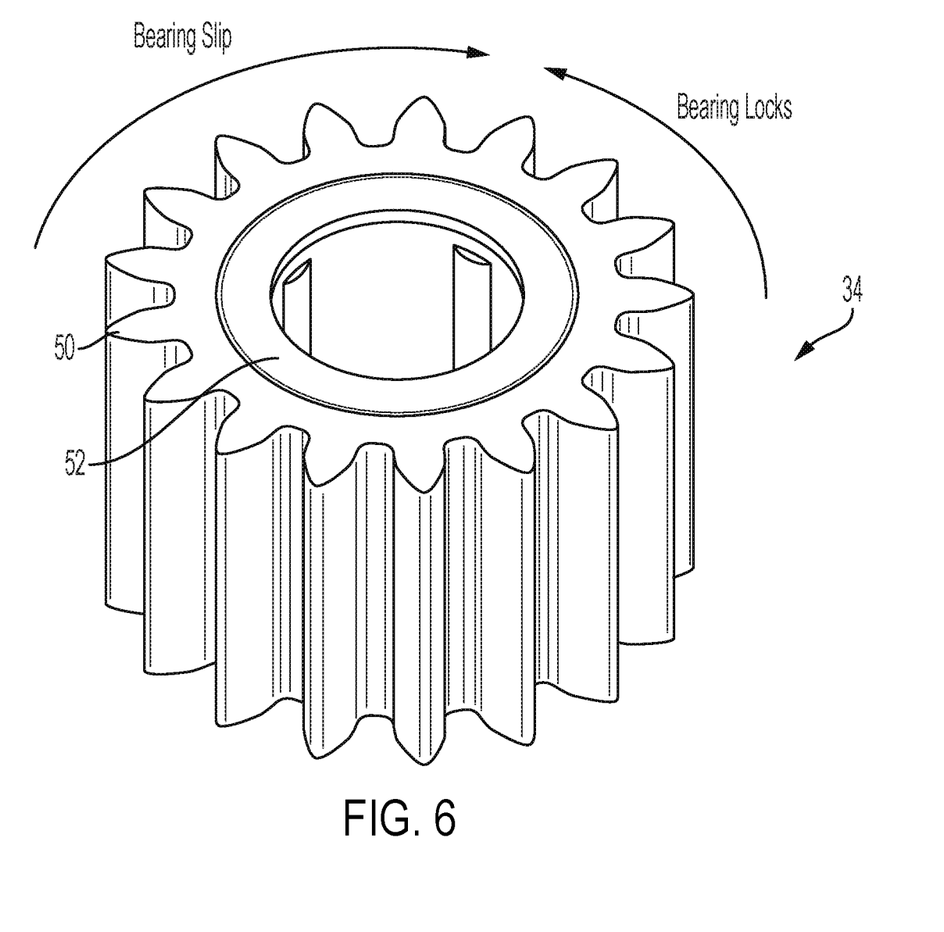
FIG. 6 shows a first embodiment of a locking one-way pinion gear.
Figure 6A:
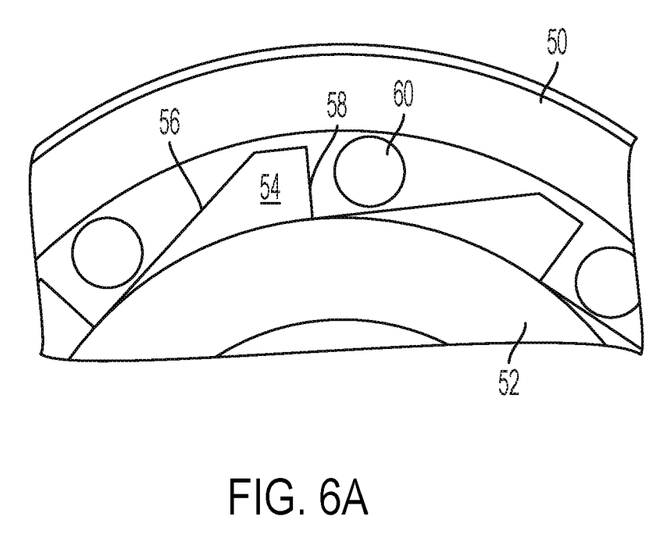
FIG. 6A is an internal view of the pinion gear FIG. 6.

Now referring to FIGS. 6 and 6A, the pinion gear 34 is a locking one-way gear that allows it to selectively rotate the drive gear 36. FIG. 6 shows the locking pinion gear 34 having an outer ring 50 and an inner ring 52, and FIG. 6A shows the internal structure between the two rings. The inner ring 52 has a series of ramps 54 having an inclined surface 56 that ends in a vertical wall 58. The ramps 54 are evenly spaced around the circumference of the inner ring 52. Rollers 60 are placed on the inclined surface 56, with the outer ring 50 holding the rollers 60 in place. A small clearance is provided between the roller 60 and the outer ring 50 when the roller is positioned at the bottom of the inclined surface 56.

When the inner ring 52 of the pinion gear 34 is rotated (through rotation of the drive shaft 30) in a counter-clockwise direction, the rollers 60 move up the inclined surface 56 and contact the outer ring 50. The rollers 60 lock the two rings together and force the outer ring 50 to rotate with the inner ring 52. When the inner ring 52 rotates in a clockwise direction, the rollers 60 move to the bottom of the inclined surface 56 and allowing the outer ring 50 to rotate freely with respect to the inner ring 52.

So, depending on the rotation of the motor, the string trimmer can selectively actuate the cutting feature on the string trimmer. For instance, in a first mode of operation, when a cutting operation is desired, the motor is rotated in the counter-clockwise direction which drives the pinion gear 34 in a counter-clockwise direction, thereby locking its inner and outer rings together. The pinion gear 34 then rotates the drive gear 36 and the spool housing 26.

In a second mode of operation, where only the blowing operation is desired, the motor rotates in the clockwise direction, which drives the inner ring 52 of the pinion gear 34 in a clockwise direction. Here, the ring 52 is allowed to rotate freely relative to the outer ring 50, and thus no rotation is imparted to the drive gear 36 and the spool housing 26 does not rotate.

It's noteworthy that in both modes of operation, the fan 28 is rotating because it is fixedly connected, via the fan coupling member 29, to the drive shaft 30. Because the fan 28 is needed when the blowing feature is desired, it may be designed to be optimized only for the second mode of operation. For example, the fan blades 74 can be designed so that when the fan is in the blow mode, it generates increased airflow compared to when it's operating in the trimming mode, where the blowing feature is not needed. Although the fan still produces some airflow in the trimming mode, it is incidental to the operation of the cutting and does not affect the tool's performance.

Figure 7:
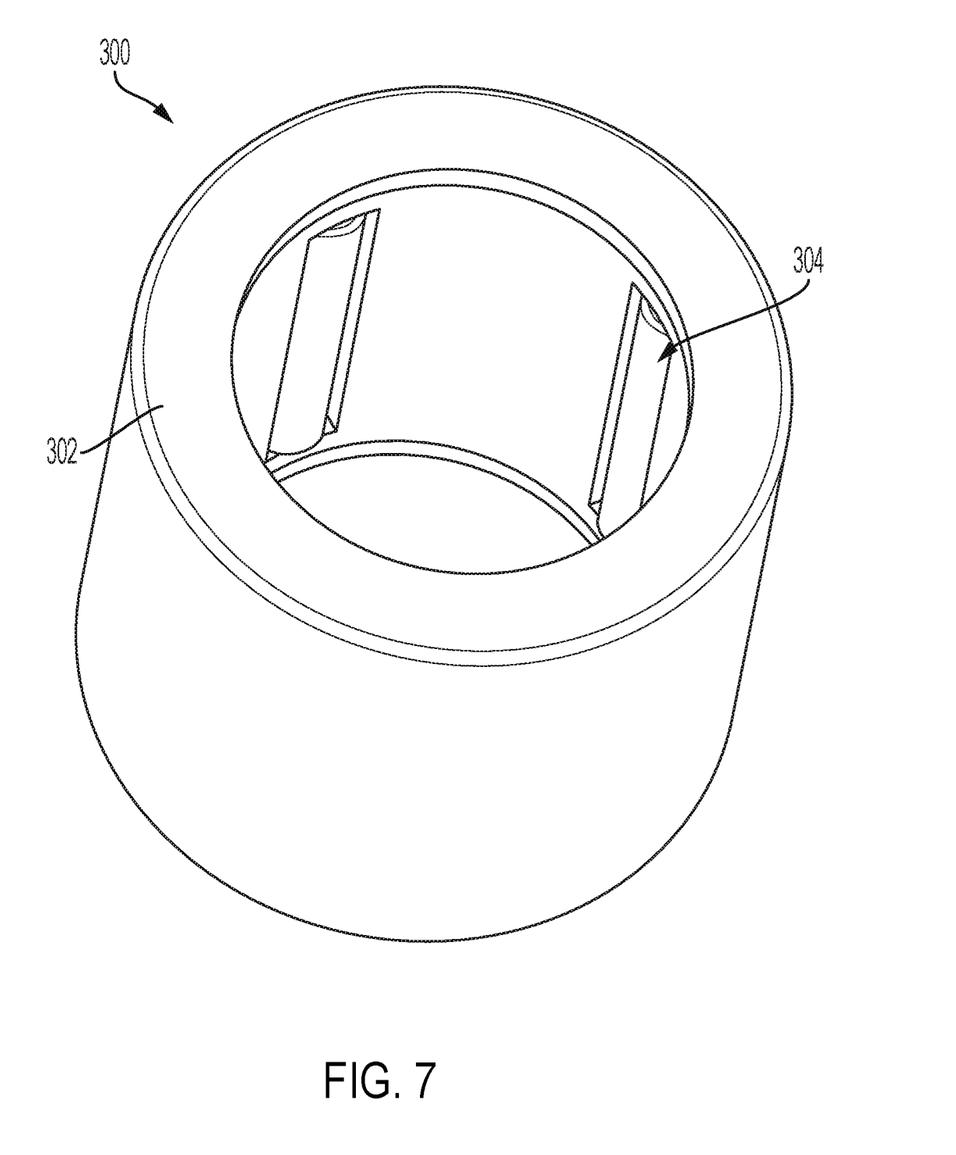
FIG. 7 shows a second embodiment of a locking one-way pinion gear.
Figure 7A:
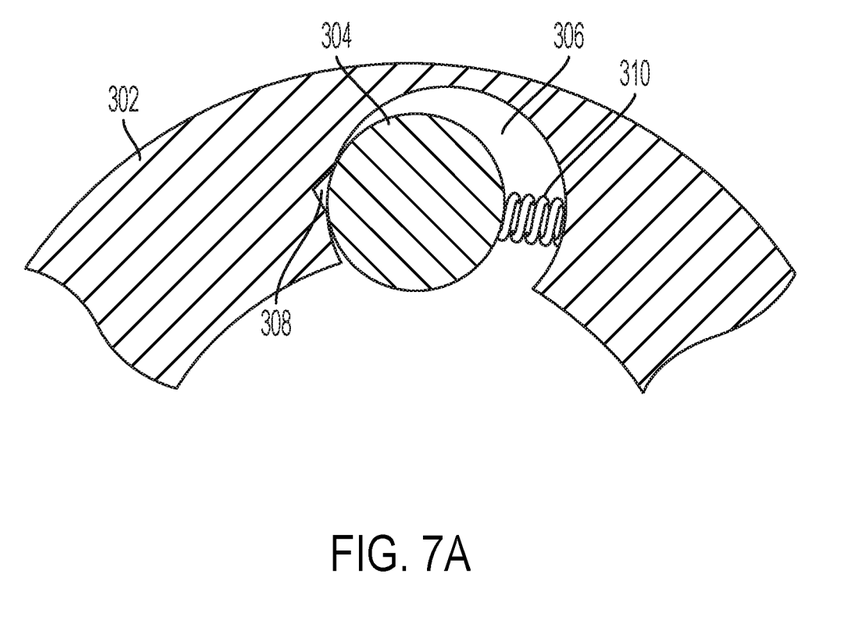
FIG. 7A is an internal view of the pinion gear of FIG. 7.

FIGS. 7 and 7A show an alternate embodiment of the pinion gear. Here the gear 300 is formed from a single ring 302 with rollers 304 embedded within the ring and slightly protruding from its interior surface. FIG. 7A is a sectional view showing the ring 302 having a cavity 306 where the roller 304 sits. The fan coupling member 29 extends through the center opening of the ring and engages the roller 304. The cavity 306 includes a V-shaped cutout 308 and a spring 310.

In the first mode of operation when trimming is desired, the drive shaft rotates in a counter-clockwise direction, which pushes the roller 304 against the cutout 308. The edges of the cutout create friction points that "grab" the rollers and lock the ring 302 to the drive shaft 30. Like in the previous embodiment, this actuates rotation of the drive gear 36 and spool housing 26. In the second mode of operation when only blowing is desired, the motor is reversed and the drive shaft 30 rotates in the clockwise direction. The roller 304 is pushed against the spring 310, away from contact with the cavity walls 306, allowing it to freely rotate, with little to no rotation being imparted to the spool housing 26.

It should be noted that although two types of one-way gears have been disclosed in the present specification, any one-way gear mechanism may fall within the scope of the invention.

Figure 8:
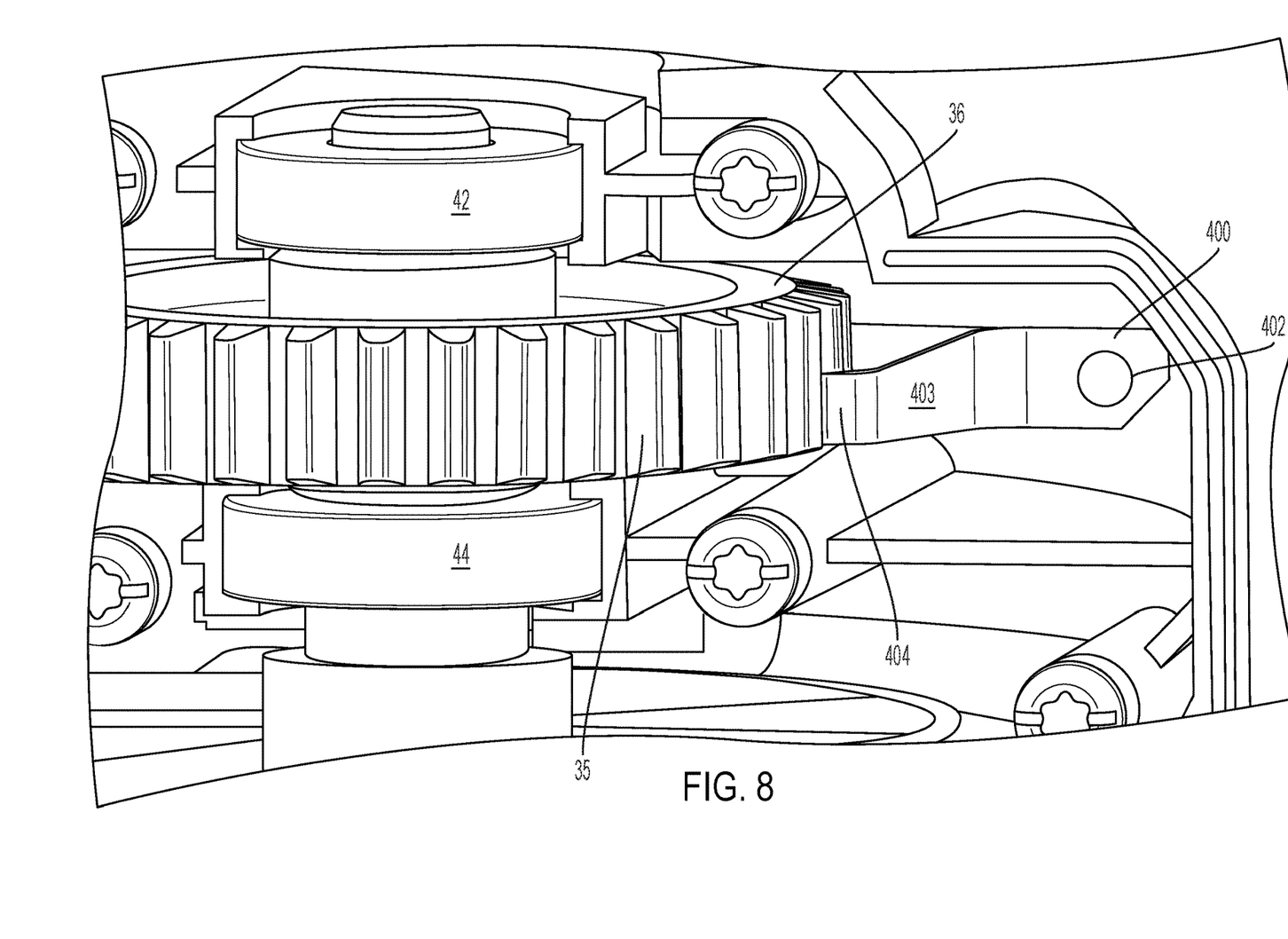
FIG. 8 shows a locking lever for the drive gear.

Now referring to FIG. 8, a further embodiment of the invention is shown. Here the transmission housing 24 includes a locking lever 400 positioned adjacent the drive gear 36. The lever 400 is affixed to one of the clamshells 100 or 102 through an aperture 402 at the base of the lever. The lever is generally Z-shaped, with an extension portion 403 and a head portion 404 that contacts the teeth 35 of the drive gear 36. When operating in the trimming mode, the lever 400 allows the gear 36 to rotate in the clockwise direction, but helps to quickly stop rotation of the spool housing 26 when no power is delivered to the motor. This reduces possible injury to the user from the rotating line. When operating in the blow mode, the shape of the lever 400 prevents the gear 36 from rotating in the counter-clockwise direction and so the spool housing does not rotate in this mode.

Figure 9:
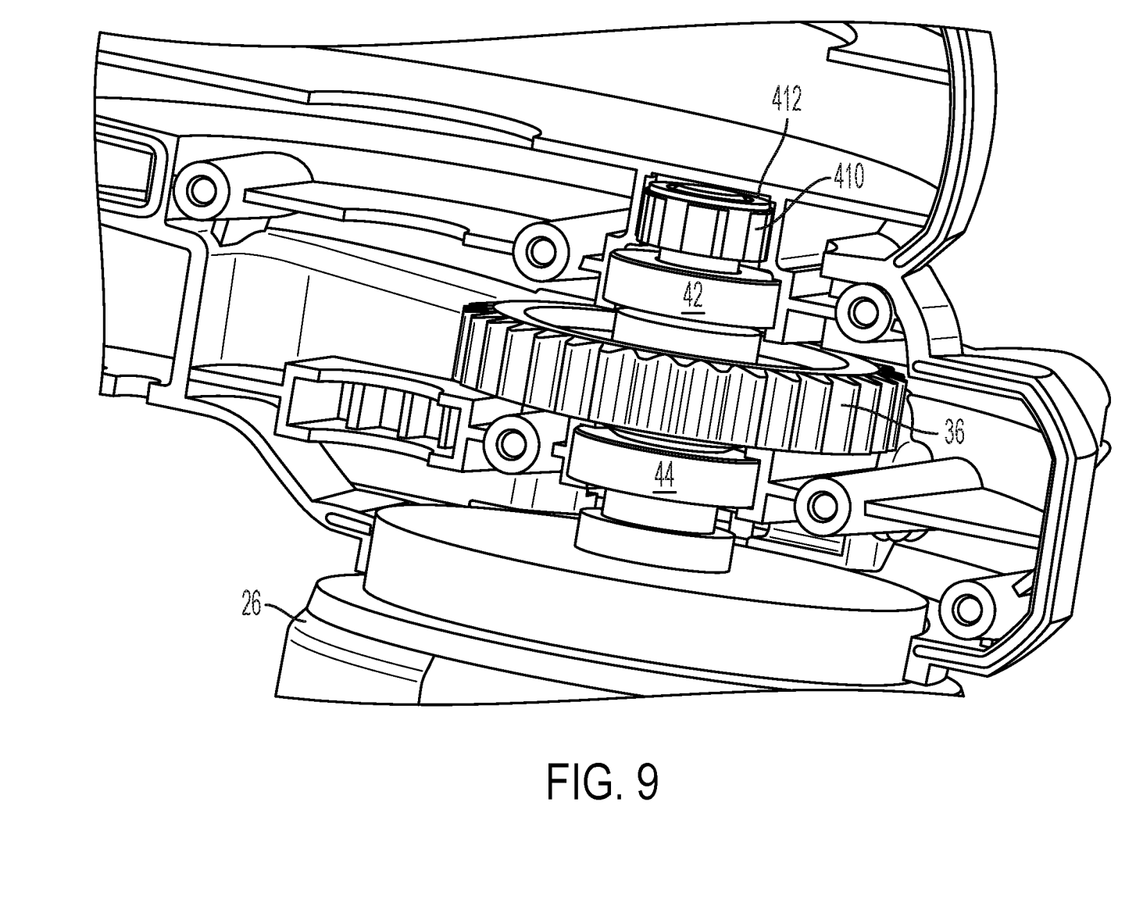
FIG. 9 shows a second embodiment of a locking mechanism for the drive gear.

FIG. 9 shows an alternate embodiment for locking mechanism shown in FIG. 8. Here, the locking lever 400 is replaced with a one-way gear 410, which is similar to the one-way gear 300 described earlier and shown in FIGS. 7 and 7A. The outer ring 302 of the gear 410 is fixedly secured in an opening 412 in the housings 100 or 102. The same shaft 40 that holds the drive gear 36, bearings 42 and 44 and spool housing 26 is inserted through the central opening of the gear 410, and so depending on its direction of rotation, it can freely rotate or is locked. In this instance, when the tool is operating in the trimming mode, the motor rotates in a counter-clockwise direction and the shaft 40 would rotate in a clockwise direction. When the tool is operating in the blowing mode, the motor and shaft rotate in the reverse. Therefore, the operation and internal structure of the one-way gear 410 is identical to the pinion gear 34, except that its locking mechanism is in reverse.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A vegetation cutting device comprising:
a motor having a drive shaft;
a fan fixedly connected to the drive shaft;
a pinion gear fixedly connected to the drive shaft;
a drive gear connected to the pinion gear;
a spool housing fixedly connected to the drive gear; and
wherein the spool housing is selectively rotatable with respect to the motor drive shaft.

2. The vegetation cutting device of claim 1, wherein in a first mode of operation the motor rotates in a first direction where the fan and the spool housing are rotated, and in a second mode of operation the motor rotates in a second direction opposite to the first direction and the fan is rotated and the spool housing is not rotated.

3. The vegetation cutting device of claim 2, wherein the pinion gear is a one-way gear that drives the drive gear when rotated in the first direction and does not drive the drive gear when rotated in a second direction.

4. The vegetation cutting device of claim 3, wherein the pinion gear has an inner ring with a series of ramps around is perimeter, an outer ring surrounding the inner ring, and rollers located in between the inner ring and outer ring, wherein in the first mode of operation the rollers move up the ramps to lock the inner ring and outer ring together for joint rotation, and in the second mode of operation, the rollers move down the ramp to allow the inner ring to rotate freely with respect to the outer ring.

5. The vegetation cutting device of claim 1, further comprising a cutting head, the cutting head having a fan housing enclosing the fan, the fan housing having a volute that extends around the fan housing to direct air out of the cutting head.

6. The vegetation cutting device of claim 5, wherein the cutting head further includes a transmission housing for enclosing the pinion gear and the drive gear, where the transmission housing is below the fan housing.

7. The vegetation cutting device of claim 5, wherein the fan is a radial fan having a top plate, a bottom plate and a series of blades between the top plate and the bottom plate.

8. The vegetation cutting device of claim 5, further comprising a locking mechanism connected to the spool housing, the locking mechanism allowing the spool housing to rotate in a first direction and locking rotation of the spool housing in a second direction.

9. A vegetation cutting device comprising:
a cutting head having a fan housing enclosing a fan and a spool housing adapted to hold a spool with filament line for cutting vegetation;
wherein one of the fan or the spool housing is selectively engageable with a drive shaft of a motor, and the other of the fan or spool housing is fixedly connected to the drive shaft;
wherein the string trimmer has a first mode of operation where the motor rotates in a first direction and both the fan and spool housing are rotated, and a second mode of operation where only one of the fan or spool housing is rotated.

10. The vegetation cutting device of claim 9, further comprising a one-way gear that selectively rotates one of the fan or spool housing depending on the direction of rotation of the motor.

11. The vegetation cutting device of claim 10, wherein the one-way gear has an inner ring with a series of ramps around is perimeter, an outer ring surrounding the inner ring, and rollers located in between the inner ring and outer ring, wherein in the first mode of operation the rollers move up the ramps to lock the inner ring and outer ring together for joint rotation, and in the second mode of operation, the rollers move down the ramp to allow the inner ring to rotate freely with respect to the outer ring.

12. The vegetation cutting device of claim 10, wherein the cutting head includes a volute that directs air out of the cutting head.

13. A vegetation cutting device comprising:
a cutting head housing a fan, a pinion gear connected to the fan and a drive gear connected to the pinion gear;
a motor having a drive shaft drivingly connected to the fan;
a spool housing adapted to hold a spool with filament line connected to the drive gear;
wherein the pinion gear is a one-way gear that selectively drives the drive gear;
wherein in a first mode of operation the motor rotates in a first direction and both the fan and spool housing are rotated, and in a second mode of operation only the fan is rotated.

14. The vegetation cutting device of claim 13, wherein the pinion gear selectively rotates the spool housing depending on the direction of rotation of the motor.

15. The vegetation cutting device of claim 14, wherein the pinion gear has an inner ring with a series of ramps around is perimeter, an outer ring surrounding the inner ring, and rollers located in between the inner ring and outer ring, wherein in the first mode of operation the rollers move up the ramps to lock the inner ring and outer ring together for joint rotation, and in the second mode of operation, the rollers move down the ramp to allow the inner ring to rotate freely with respect to the outer ring.

16. The vegetation cutting device of claim 14, wherein the cutting head includes a volute that directs air out of the cutting head.

* * * * *